(12) United States Patent
Lei

(10) Patent No.: US 7,060,235 B2
(45) Date of Patent: Jun. 13, 2006

(54) METHOD FOR PROCESSING PERFLUOROCOMPOUNDS EXHAUST

(75) Inventor: Tien Lei, Taoyuan (TW)

(73) Assignee: Desiccant Technology Corporation, Taoyuan (TW)

( * ) Notice: Subject to any disclaimer, the term of this patent is extended or adjusted under 35 U.S.C. 154(b) by 206 days.

(21) Appl. No.: 10/754,730

(22) Filed: Jan. 12, 2004

(65) Prior Publication Data

US 2004/0141900 A1 Jul. 22, 2004

(30) Foreign Application Priority Data

Jan. 14, 2003 (TW) .......................... 92100650 A

(51) Int. Cl.
*A62D 3/00* (2006.01)

(52) U.S. Cl. ............................... 423/240 R; 423/245.1; 588/406; 588/415

(58) Field of Classification Search ............... 423/245.1, 423/240 R; 588/206, 207, 209, 210, 211, 588/212
See application file for complete search history.

(56) References Cited

U.S. PATENT DOCUMENTS

| | | | | |
|---|---|---|---|---|
| 5,187,072 A | * | 2/1993 | Cullimore et al. | 422/168 |
| 6,277,347 B1 | * | 8/2001 | Stearns et al. | 423/240 R |
| 6,361,706 B1 | * | 3/2002 | Gabriel | 216/67 |
| 6,540,930 B1 | * | 4/2003 | Kesari et al. | 216/67 |

* cited by examiner

*Primary Examiner*—Edward M. Johnson
(74) *Attorney, Agent, or Firm*—Troxell Law Office, PLLC

(57) ABSTRACT

This invention provides a method for processing perfluorocompounds exhaust, that employs thermal energy produced by the reactions occurred in a plasma reactor to convert liquid water into steam. The steam is then directly introduced into the plasma reactor to participate in the reactions of plasma stream. This invention resolves the high temperature problem encountered by the reaction chamber during combustion. In addition, this invention is provided with a combustion chamber connecting to the reacting chamber. Air is introduced into the combustion chamber to combust with hydrogen so as to remove a great mount of hydrogen produced by the combustion of the perfluorocompounds exhaust.

16 Claims, 2 Drawing Sheets

METHOD FOR PROCESSING PERFLUOROCOMPOUNDS EXHAUST

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of Invention

This invention relates to a method for processing perfluorocompounds exhaust, particular to one capable of dealing with the inflammable hydrogen accompanied by the addition of steam during combustion of the exhaust.

2. Background

Members of the United Nations have agreed upon a project and corresponding timetable aiming at reduction of six primary greenhouse gasses in accordance with the "United Nations Framework Convention on Climate Change-Kyoto Protocol 1997," among which greenhouse gasses $SF_6$, HFCs and PFCs are the primary man-made high effective greenhouse gases with a high Global Warming Potential (GWP), possess an extensive life cycle, and are able to suspend in the atmosphere for a suspended period of time to produce irreversible effects as a result of their accumulation in the atmosphere. In recent years, the production of semiconductors (such as in the process for cleaning dry-etched CVD chambers) regularly utilizes PFCs, such as $CF_4$, $C_2F_6$, $C_3F_8$ or $NF_3$ as the processing gases, while very few of which gases are actually depleted during the manufacturing process and the majority of which, such as 90% of the gasses utilized during the CVD process, are discharged as exhausts thereby forming a primary source of the greenhouse effects. Nations that are active in the manufacturing of semiconductors have reached a mutual understanding and agreed upon the formulation of regulations to reduce emission of PFCs gasses. However, along with the on-going developments of manufacturing semiconductors, the PFCs consumption grows with each passing day. Hence, it is necessary to control and deal with such toxic gases to prevent environmental contamination, such as implementing a new PFCs exhaust processing system to act in response to the increasingly stringent emission standards.

The currently available devices that are most effective in processing technical toxic gas exhaust are designed based on the principles of high temperature pyrolysis by implementing high energy density plasma to serve the cleaning and detoxicating purposes. Such devices for processing perfluorocompounds exhaust may be implemented in processing toxic gases, such as PFCs, such as $C_2F_6$, $SiH_4$, $CF_4$, $NF_3$ and $CHF_3$, produced by the semiconductor and other industries. The underlying principles of such devices are described as follows. A high temperature and high energy density plasma generated by a DC plasma torch subjects PFCs in the exhaust to instantaneous pyrolysis, atomization or ionization thereby breaking down and destructing the chemical bonds of PFCs and reacting with water or oxygen to become molecules or atoms that are easily processed, such as CO, $CO_2$ and HF, without forming molecules having a complicated composition. The reactions may be described by the following equations:

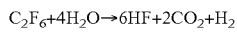
$$C_2F_6 + 4H_2O \rightarrow 6HF + 2CO_2 + H_2$$

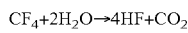
$$CF_4 + 2H_2O \rightarrow 4HF + CO_2$$

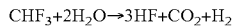
$$CHF_3 + 2H_2O \rightarrow 3HF + CO_2 + H_2$$

FIG. 1 illustrates a conventional device for plasma processing PFCs exhaust. The device is operated by introducing exhaust directly into a plasma reactor 110. The plasma reactor 110 includes an exhaust inlet 111, a plasma torch 112, a reacting chamber 113, and a steam generating boiler 115, wherein the reacting chamber 113 interior is constructed of refractory materials. A high temperature ambient is achieved under heating of the plasma torch to facilitate reactions. It is known from the above chemical equations that water is required to participate in the reaction for $C_2F_6 + 4 H_2O \rightarrow 6 HF + 2 CO_2 + H_2$. The extremely high temperature plasma stream (about 10,000° C.) produced by the plasma torch 112 subjects the toxic gases exhaust entering through the exhaust inlet 111 to instantaneous pyrolysis, a tomization or ionization in the reacting chamber 113 thereby breaking down and destructing the chemical bonds of the PFCs to become molecules or atoms that are easily processed, upon reacting with the steam produced by the steam generating boiler 115 and entering through the steam inlet 114, without forming molecules having a complicated composition. The above-described processes cannot be possibly achieved by conventional combustion furnaces. Due to the high temperature of the exhaust processed by the plasma reactor 110 and to deal with HF and $H_2$ produced by the reactions, a water injector assembly 120 is provided at an outlet of the reacting chamber 113 of the reactor 110. The water injector assembly 120 is provided with a water flow regulating valve 121 for regulating injection of vapor from the water injector assembly 120. The water vapor injected by the water injector assembly 120 would absorb the thermal energy to rapidly reduce the products temperature and to dissolve a part of HF in the exhaust products in a water tank 130, while the remaining exhaust products precipitating above the water tank surface are then drained along with the wastewater by means of bottom draining.

Because temperature would affect the extent of gaseous dissolution, the exhaust products after being cooled by the water vapor are introduced into a wet washing tower 150 that is filled therein with filler having a high surface area and equipped with a water injector assembly 151. The source of the water injector assembly 151 is supplied by the water tank 130 through a pump 140. A filter 141 may be provided at an upstream of the pump 140 to strain away impurities and solids contained in the water. Solids, such as silicon powders, carried by the toxic gas exhaust would be cleaned and strained away when the exhaust products pass through the wet washing tower 150 that absorbs HF at the same time. To facilitate processing of HF, lye may be added to the injected water vapor to neutralize the acidity resulted from HF. Under most circumstances, for plants that are equipped with wastewater processing stations, wastewater containing fluorides may be processed by the wastewater processing stations. Hence, the water stored in the water tank may be drained by batches or continuously to the wastewater processing stations. When there is an insufficient gas flow static pressure from the exhaust source, a windmill 160 may be added to a downstream of the wet washing tower 150 to make up a deficiency of the static pressure and to assist in discharging the desired volume. The implementation of such a plasma reactor 110, as compared to the conventional method of processing exhaust by combustion, provides a higher energy density so as to significantly improve the pyrolysis efficiency of the PFCs. The device has great environmental values as more than 99% of $C_2F_6$ is destructed and removed by adopting such a device and is proven to be capable of processing a variety of PFCs exhaust, and destructing the chemical bonds of toxic gases, such as $CF_4$, $C_2F_6$ and $NF_3$ to decompose and remove more than 99% of such toxic gases.

However, such devices are not widely adopted by the industries to process exhaust because, because steam must be introduced into the plasma reactor and participate the reactions to ensure complete combustion of the exhaust, whereby an additional equipment is needed to produce the steam thereby increasing the cost. In addition, the spontaneous combustion characteristic of $H_2$ produced upon pyrolysis of PFCs, which takes on a great proportion of the exhaust products, would cause hazards in subsequent processes and pose as a safety concern in the implementation of such a device for plasma processing PFCs exhaust.

SUMMARY OF THE INVENTION

It is a primary objective of this invention to provide a method for processing perfluorocompounds exhaust that employs the thermal energy generated by combustion of the exhaust to convert liquid water into steam.

It is another objective of this invention to provide a method for processing perfluorocompounds exhaust equipped with an additional combustion chamber in the device for mixing and combustion air with $H_2$ contained in the exhaust products, so as to reduce the content of $H_2$ in the exhaust products.

This invention adopts the following measures to achieve the above objectives. First, the exhaust is joined to a high temperature plasma torch prior to being introduced into and reacting in the reaction chamber. The plasma torch includes a steam inlet and a steam conduit, wherein heat produced by the reactions occurring in the plasma reactor converts liquid water flowing in the steam conduit to steam. The steam then joins the plasma torch to participate the reactions of the toxic gases. Then, to reduce the content of $H_2$ in the exhaust products, an additional combustion chamber is provided for reacting external air with $H_2$ therein and removing $H_2$.

Then, the remaining exhaust products produced by the combustion reactions enter a water tank. Water vapor injected by a water injector assembly provided in the water tank then absorbs thermal energy to rapidly reduce the products temperature and to dissolve a part of HF in the exhaust products, while the remaining exhaust products precipitating above the water tank surface are then drained along with the wastewater by means of bottom draining. Because temperature would affect the extent of gaseous dissolution, the exhaust products after being cooled by the water vapor pass through wet washing tower to strain away impurities and solids contained therein.

DESCRIPTION OF THE DRAWINGS

These and other modifications and advantages will become even more apparent from the following detained description of a preferred embodiment of the invention and from the drawings in which.

DETAILED DESCRIPTION OF THE INVENTION (PREFERRED EMBODIMENTS)

According to this invention, the steam added to the reactions for processing PFCs is produced by the thermal energy generated by combustion of the exhaust. Furthermore, an additional combustion chamber is added to remove the large amount of $H_2$ produced by the reactions.

Figure 1:
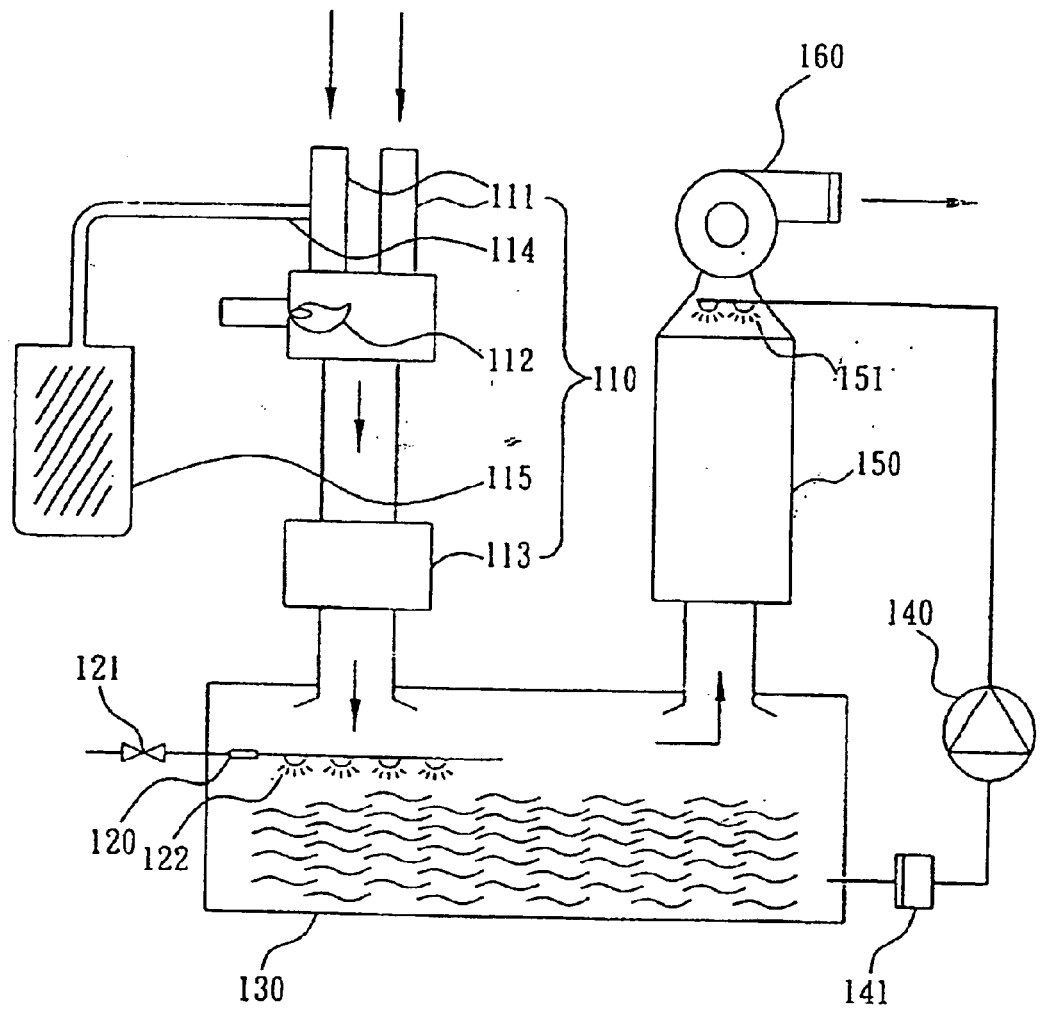
FIG. 1 illustrates a conventional device for plasma processing PFCs exhaust.
Figure 2:
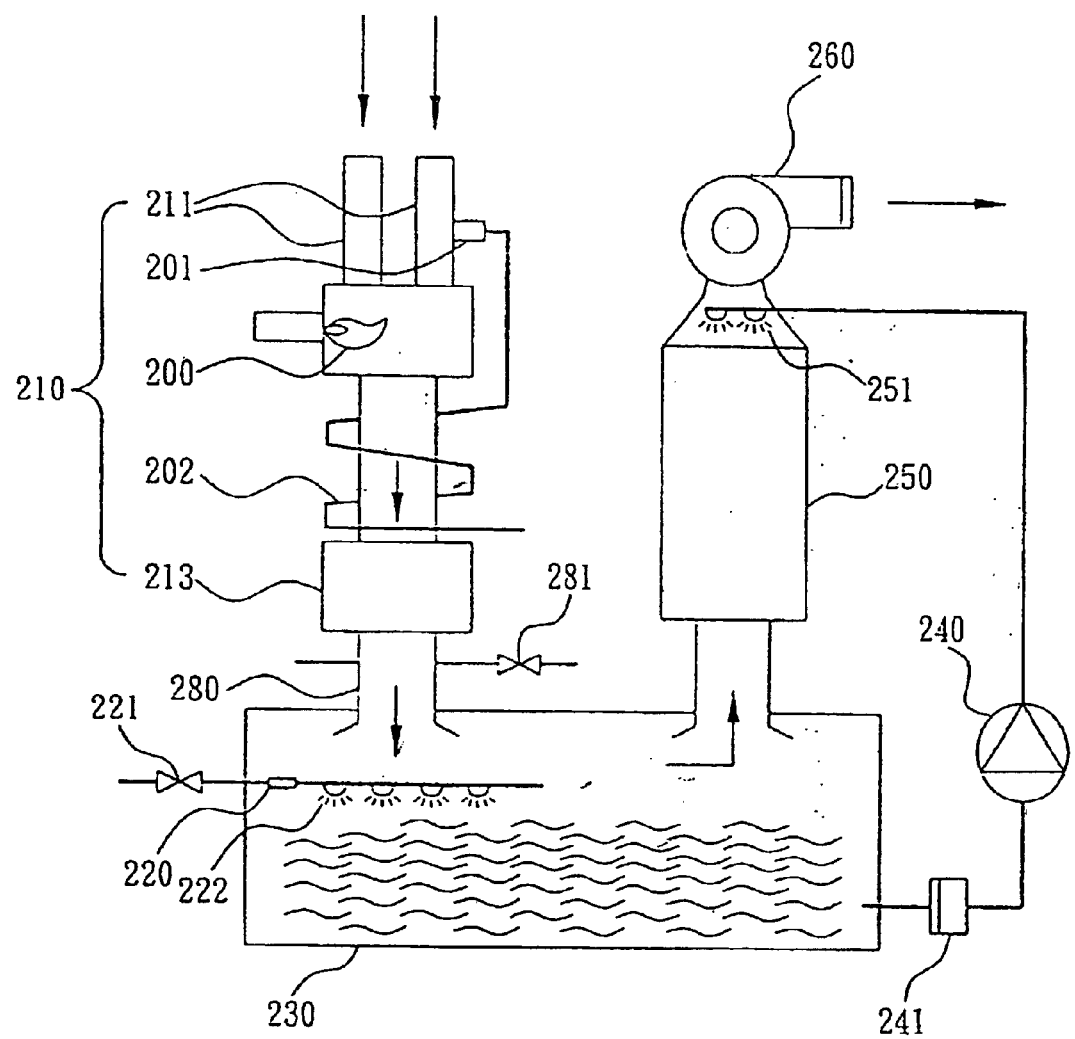
FIG. 2 illustrates a device for plasma processing PFCs exhaust according to this invention

FIG. 2 illustrates a device for plasma processing PFCs exhaust according to this invention. First, the exhaust is joined to a high temperature plasma torch prior to being introduced into and reacting in the reaction chamber. A water injector assembly is provided at an outlet of the reacting chamber. The exhaust, after being cooled by the water injector assembly, is introduced into a wet washing tower and then drained. The circulating water used by the wet washing tower is supplied by a water tank. According to this invention, the plasma torch 200 includes: a steam inlet 201 and a steam conduit 202. The tubing arrangement of the steam conduit 202 is one of the essential features of this invention, where the steam conduit 202 originates from a water tank set, encircles a plasma reactor 210 in an appropriate manner, and then extends upwards to reach the steam inlet 201. When liquid water flows in the steam conduit 201 surrounding the plasma reactor 210, the thermal energy produced in the plasma reactor would convert the liquid water into steam. The steam then joins the plasma torch 200 to participate in the reactions of the toxic gases.

To improve the production efficiency of the plasma torch in producing extremely high temperature (about 10,000° C.) plasma stream, the steam needs to be introduced into the plasma reactor to participate in the reactions. According to this invention, the thermal energy generated by the reactions occurring in the plasma reactor converts the liquid water into steam by means of heat-exchange. The steam is then introduced into the plasma reactor to participate in the reactions. Such measures reduce the cost as an additional heater is not required, while reducing the products temperature at the same time thereby improving the extent of exhaust products dissolved in the water to facilitate later processes.

The plasma reactor 210 includes: an exhaust inlet 211 and a reacting chamber 213, wherein the reacting chamber 213 interior is constructed of refractory materials. A high temperature ambient is achieved under heating of the plasma torch. PFCs exhaust enters the plasma reactor 210 through the exhaust inlet 211. The extremely high temperature plasma stream (about 10,000° C.) produced by the plasma torch 200 subjects the exhaust to instantaneous pyrolysis, atomization or ionization in the reacting chamber 213 thereby breaking down and destructing the chemical bonds of the PFCs to become molecules or atoms that are easily processed, without forming molecules having a complicated composition. Due to the high temperature of the exhaust processed by the plasma reactor 210 and to deal with HF and $H_2$ produced by the reactions, where $H_2$ may easily cause explosions in later processes, an additional combustion chamber 280 is provided at an outlet of the reacting chamber 213. By taking advantages of the negative pressure within the device for processing the PFCs exhaust, external air may by introduced into the reacting chamber 280 through regulations of a control valve 281, to allow reaction of oxygen in the air with $H_2$ in the reacting chamber 280 thereby removing the large amount of $H_2$. Such a feature is also one of the essential features of this invention.

Then, similar to a conventional device for plasma processing PFCs exhaust, the remaining exhaust products produced by the combustion reactions enter a water tank. A water injector assembly 220 having a water flow regulating valve 221 for regulating injection of vapor from a water nozzle 222 of the water injector assembly 220 would absorb the thermal energy to rapidly reduce the products temperature and to dissolve a part of HF in the water tank 230, while the remaining exhaust products precipitating above the water tank surface are then drained along with the wastewater by means of bottom draining. The water source (not shown) of the water injector assembly 220 is supplied by pumping water from a bottom of the water tank 230 through a pump 240. A filter 241 may be provided at an upstream of the pump 240 to strain away impurities and solids contained in the water. Because temperature would affect the extent of gaseous dissolution, the exhaust products after being cooled by the water vapor and filtered by the filter 241 to strain away impurities and solids, are introduced into a wet washing tower 250 that is filled therein with filler having a high surface area. Solids, such as silicon powders, carried by the exhaust products would be cleaned and strained away when the exhaust products pass through the wet washing tower that absorbs HF at the same time. To facilitate processing of HF, lye may be added to the injected water vapor to neutralize the acidity resulted from HF. When there is an insufficient gas flow static pressure from the exhaust source, a windmill 260 may be added to a downstream of the wet washing tower 250 to make up a deficiency of the static pressure and to assist in discharging the desired volume.

This invention is related to a novel creation that makes a breakthrough in the art. Aforementioned explanations, however, are directed to the description of preferred embodiments according to this invention. Since this invention is not limited to the specific details described in connection with the preferred embodiments, changes and implementations to certain features of the preferred embodiments without altering the overall basic function of the invention are contemplated within the scope of the appended claims.

What is claimed is:

1. A method for processing perfluorocompounds (PFCs) exhaust, comprising the steps of:
   (a) creating steam in a steam conduit encircling a reacting chamber utilizing heat from the reacting chamber;
   (b) introducing the PFCs exhaust and the steam into the reacting chamber after passing through a plasma torch and subjecting the PFCs to instantaneous pyrolysis to produce exhaust products, the steam being supplied by the steam conduit encircling the reacting chamber;
   (c) introducing external air into a combustion chamber to react with exhaust products in the combustion chamber;
   (d) dissolving HF in the exhaust products in a water tank set and removing fine solid molecules in the exhaust products and precipitated in the water tank set; and
   (e) processing the remaining exhaust products by a wet washing tower.

2. The method for processing perfluorocompounds exhaust in claim 1, wherein the steam in the steam conduit is converted from liquid water flowing the steam conduit by heat produced by the reactions of the PFCs exhaust in the reacting chamber.

3. The method for processing perfluorocompounds exhaust in claim 2, wherein the liquid water is circulating water originates from the water tank set.

4. The method for processing perfluorocompounds exhaust in claim 1, wherein the external air is introduced into the combustion chamber by means of a regulating valve.

5. The method for processing perfluorocompounds exhaust in claim 4, wherein the combustion chamber includes a plurality of regulating valves.

6. The method for processing perfluorocompounds exhaust in claim 1, wherein the steam conduit reduces temperature of the reacting chamber during combustion.

7. A method for processing perfluorocompounds exhaust, comprising the steps of:
   (a) creating steam in a steam conduit encircling a reacting chamber utilizing heat from the reacting chamber;
   (b) introducing the PFCs exhaust and the steam into the reacting chamber after passing through a plasma torch and subjecting the PFCs to instantaneous pyrolysis to produce exhaust products;
   (c) introducing external air into a combustion chamber to react with exhaust products in the combustion chamber;
   (d) processing the exhaust products in a water tank set; and
   (e) processing the remaining exhaust products by a wet washing tower.

8. The method for processing perfluorocompounds exhaust in claim 7, wherein the steam is supplied by a steam conduit encircling the reacting chamber, and the steam in the steam conduit is converted from liquid water flowing the steam conduit by heat produced by the reactions of the PFCs exhaust in the reacting chamber.

9. The method for processing perfluorocompounds exhaust in claim 8, wherein the liquid water is circulating water originates from the water tank set.

10. The method for processing perfluorocompounds exhaust in claim 7, wherein the combustion chamber is connected to a downstream of the reacting chamber.

11. The method for processing perfluorocompounds exhaust in claim 7, wherein combustion chamber includes a plurality of regulating valves.

12. The method for processing perfluorocompounds exhaust in claim 7, wherein the steam conduit reduces temperature of the reacting chamber during combustion.

13. A method for processing perfluorocompounds exhaust, comprising the steps of:
   (a) creating steam in a steam conduit encircling a reacting chamber utilizing heat from the reacting chamber;
   (b) introducing the PFCs exhaust and the steam into the reacting chamber after passing through a plasma torch and subjecting the PFCs to instantaneous pyrolysis to produce exhaust products, the steam being supplied by the steam conduit encircling the reacting chamber;
   (c) dissolving HF in the exhaust products in a water tank set and removing fine solid molecules in the exhaust products and precipitated in the water tank set; and
   (d) processing the remaining exhaust products by a wet washing tower.

14. The method for processing perfluorocompounds exhaust in claim 13, wherein the steam in the steam conduit is converted from liquid water flowing the steam conduit by heat produced by the reactions of the PFCs exhaust in the reacting chamber.

15. The method for processing perfluorocompounds exhaust in claim 14, wherein the liquid water is circulating water originates from the water tank set.

16. The method for processing perfluorocompounds exhaust in claim 13, wherein the steam conduit reduces temperature of the reacting chamber during combustion.

* * * * *